United States Patent
Kim et al.

(10) Patent No.: US 10,850,766 B2
(45) Date of Patent: Dec. 1, 2020

(54) PORTABLE DEVICE DATA CALIBRATION

(71) Applicant: Ford Global Technologies, LLC, Dearborn, MI (US)

(72) Inventors: Yu Seung Kim, San Jose, CA (US); Chun-Yu Chen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 28 days.

(21) Appl. No.: 16/264,742

(22) Filed: Feb. 1, 2019

(65) Prior Publication Data
US 2020/0247463 A1    Aug. 6, 2020

(51) Int. Cl.
*B62D 5/04* (2006.01)
*G07C 5/08* (2006.01)
*B60W 50/00* (2006.01)

(52) U.S. Cl.
CPC .......... *B62D 5/0484* (2013.01); *B60W 50/00* (2013.01); *G07C 5/085* (2013.01); *B60W 2050/0056* (2013.01); *B60W 2050/0083* (2013.01); *B60W 2540/10* (2013.01); *B60W 2540/12* (2013.01); *B60W 2540/18* (2013.01)

(58) Field of Classification Search
CPC ..... B62D 5/0484; G07C 5/085; B60W 50/00; B60W 2540/12; B60W 2050/0083; B60W 2540/18; B60W 2540/10; B60W 2050/0056
See application file for complete search history.

(56) References Cited

U.S. PATENT DOCUMENTS

| | | | |
|---|---|---|---|
| 9,253,603 B1* | 2/2016 | Dong | H04W 4/48 |
| 9,581,615 B2* | 2/2017 | Basir | G01P 21/00 |
| 9,958,473 B1* | 5/2018 | Sljivar | G01C 25/00 |
| 10,078,099 B2* | 9/2018 | Cordova | G01C 21/16 |
| 2004/0257023 A1* | 12/2004 | Tamisier | F16C 32/0451 318/632 |
| 2010/0318257 A1* | 12/2010 | Kalinadhabhotla | G01P 21/00 701/31.4 |
| 2013/0081259 A1* | 4/2013 | Willis | G01P 21/00 29/593 |
| 2014/0149145 A1* | 5/2014 | Peng | G06F 3/0346 705/4 |
| 2018/0259350 A1* | 9/2018 | Al-Hamad | G01C 21/3415 |
| 2020/0080527 A1* | 3/2020 | Khafagy | F02N 11/0822 |
| 2020/0247463 A1* | 8/2020 | Kim | B62D 5/0484 |
| 2020/0269091 A1* | 8/2020 | Liu | A63B 24/0075 |

OTHER PUBLICATIONS

Almazan et al., "Full auto-calibration of a smartphone on board a vehicle using IMU and GPS embedded sensors", IEEE Intelligent Vehicles Symposium (IV), At Gold Coast, Australia, vol. 1, pp. 1374-1380, https://www.researchgate.net/publication/260353458_Full_auto-calibration_of_a_smartphone_on_board_a_vehicle_using_IMU_and_GPS_embedded_sensors.

* cited by examiner

*Primary Examiner* — Frederick M Brushaber
(74) *Attorney, Agent, or Firm* — Frank A. MacKenzie; Beijin Bieneman PLC

(57) ABSTRACT

A computer includes a processor and a memory, the memory storing instructions executable by the processor to initiate a calibration based on a portable device stability and a steering wheel angle, detect a vehicle pedal actuation, and, then, based on a portable device acceleration, determine a calibration vector between a portable device coordinate system and a vehicle coordinate system.

20 Claims, 5 Drawing Sheets

PORTABLE DEVICE DATA CALIBRATION

BACKGROUND

Vehicles collect data from sensors. The data may be interpreted according to a coordinate system defined by the vehicle. For example, the coordinate system may have an origin at a specified point on the vehicle and may define axes along vehicle-forward, vehicle-left, and vertical directions. A computer in the vehicle can use data according to the coordinate system to, e.g., identify a position, speed, and/or acceleration of surrounding objects.

DETAILED DESCRIPTION

Figure 1:
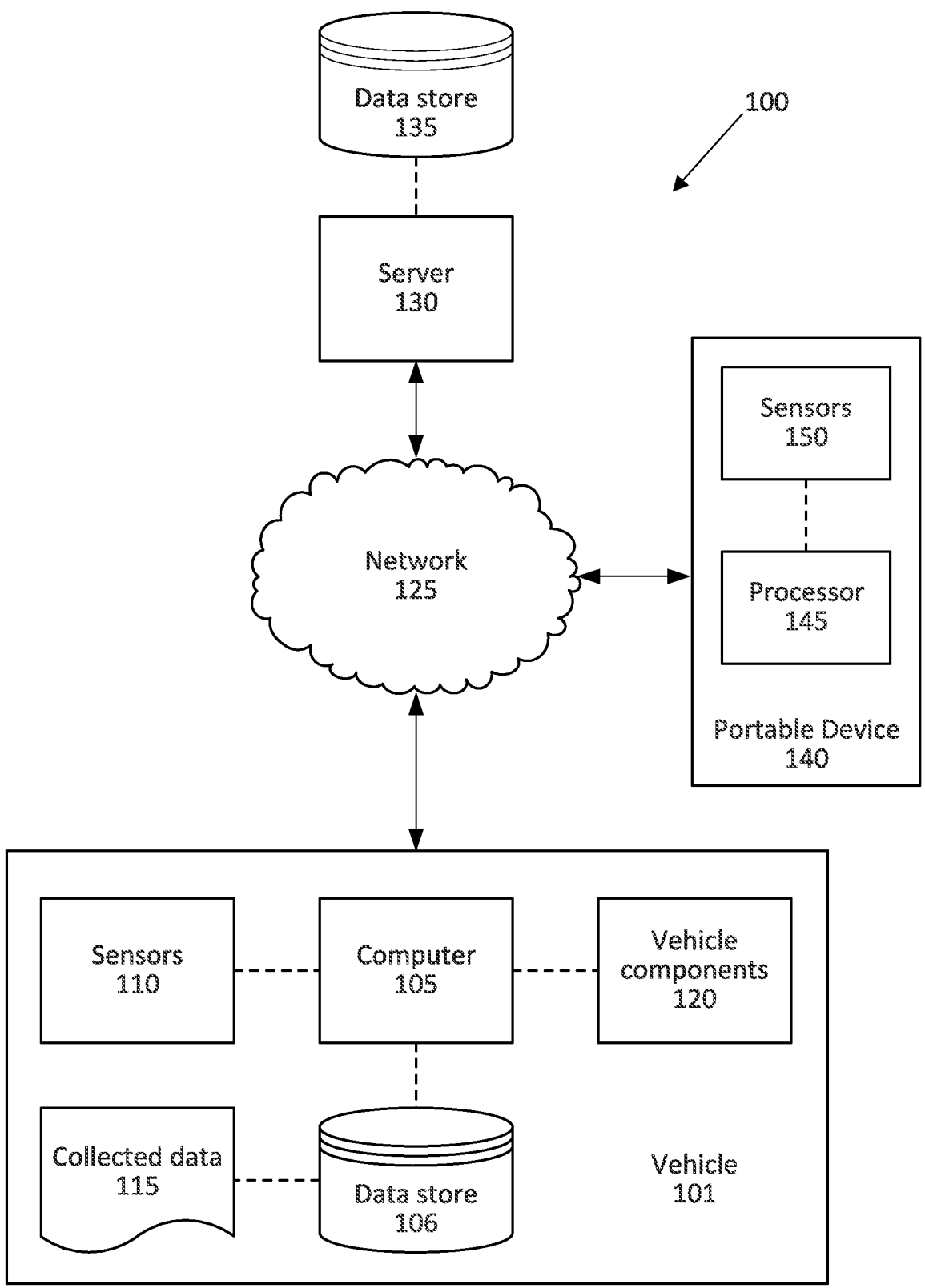
FIG. 1 is a block diagram of an example system for performing a calibration.

A system includes a computer including a processor and a memory, the memory storing instructions executable by the processor to initiate a calibration based on a portable device stability and a steering wheel angle, detect a vehicle pedal actuation, and, then, based on a portable device acceleration, determine a calibration vector between a portable device coordinate system and a vehicle coordinate system.

The instructions can further include instructions to determine that the portable device is stable when an angular velocity of the portable device is below a threshold.

The instructions can further include instructions to initiate the calibration when the steering wheel angle is below a steering threshold.

The instructions can further include instructions to determine the calibration vector based on a gravity vector and a heading vector of the portable device.

The instructions can further include instructions to determine a gravity vector based on an acceleration of the portable device.

The instructions can further include instructions to apply a low-pass filter to acceleration data from the portable device to determine the gravity vector.

The instructions can further include instructions to determine the calibration vector based on a heading vector of the vehicle.

The vehicle pedal actuation can be one of an accelerator pedal actuation or a brake pedal actuation.

The instructions can further include instructions to determine the calibration vector based on a vehicle longitudinal acceleration.

The instructions can further include instructions to determine the portable device stability based on data from a portable device gyroscope.

The instructions can further include instructions to determine an angular velocity of the portable device based on the data from the portable device gyroscope.

The instructions can further include instructions to determine the calibration vector upon detecting the pedal actuation in a specified time period.

A method includes initiating a calibration based on a portable device stability and a steering wheel angle, detecting a vehicle pedal actuation, and, then, based on a portable device acceleration, determining a calibration vector between a portable device coordinate system and a vehicle coordinate system.

The method can further include determining that the portable device is stable when an angular velocity of the portable device is below a threshold.

The method can further include initiating the calibration when the steering wheel angle is below a steering threshold.

The method can further include determining the calibration vector based on a gravity vector and a heading vector of the portable device.

The method can further include determining a gravity vector based on an acceleration of the portable device.

The method can further include applying a low-pass filter to acceleration data from the portable device to determine the gravity vector.

The method can further include determining the calibration vector based on a heading vector of the vehicle.

The method can further include determining the calibration vector based on a vehicle longitudinal acceleration.

The method can further include determining the portable device stability based on data from a portable device gyroscope.

The method can further include determining an angular velocity of the portable device based on the data from the portable device gyroscope.

The method can further include determining the calibration vector upon detecting the pedal actuation in a specified time period.

A system includes a portable device, means for initiating a calibration based on a portable device stability and a steering wheel angle, means for detecting a vehicle pedal actuation, and means for determining a calibration vector between a portable device coordinate system and a vehicle coordinate system based on a portable device acceleration.

The system can further include means for determining that the portable device is stable when an angular velocity of the portable device is below a threshold.

The system can further include means for initiating the calibration when the steering wheel angle is below a steering threshold.

The system can further include means for determining the calibration vector based on a gravity vector and a heading vector of the portable device.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can collect data from a portable device to operate vehicle components. The data from the portable device can be collected in a local three-dimensional coordinate system, i.e., a portable device coordinate system. The portable device coordinate system can be rotated relative to a three-dimensional vehicle coordinate system such that one or more axes of the portable device coordinate system are not aligned with axes of the vehicle coordinate system. In order to use data from the portable device, the computer can align data from the portable device to the vehicle coordinate system.

One way to align the data is to use an accelerometer and a magnetometer in the portable device to determine a calibration vector to transform data from the portable device coordinate system to the vehicle coordinate system. However, the portable device may not include a magnetometer, and the surrounding magnetic field from the earth can interfere with the magnetometer's readings.

By using longitudinal acceleration and gravitational acceleration of the portable device and the vehicle, the computer can determine the calibration vector using only acceleration data. When the portable device is stable relative to the vehicle and the vehicle accelerates in a longitudinal direction, the acceleration on the portable device is in the same direction as the acceleration of the vehicle. Thus, transforming vectors defining acceleration of the portable device to vectors defining acceleration of the vehicle (which can be determined by the computer) results in the calibration vector to transform data from the portable device coordinate system to the vehicle coordinate system using only acceleration data.

FIG. 1 illustrates an example system 100 for performing a calibration. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, or the like.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a portable device 140. The portable device 140 may be any one of a variety of computing devices including a processor and a memory, e.g., a smartphone, a tablet, a personal digital assistant, a dash-board-mounted camera, a gesture recognition device, etc. The user device 140 communicate with the vehicle computer 105 over the network 125. The portable device 140 generally includes a processor 145 and a plurality of sensors 150. The sensors 150 may include, e.g., a location sensor, a camera, an audio-video collector, a gyroscope, etc.

Figure 2:
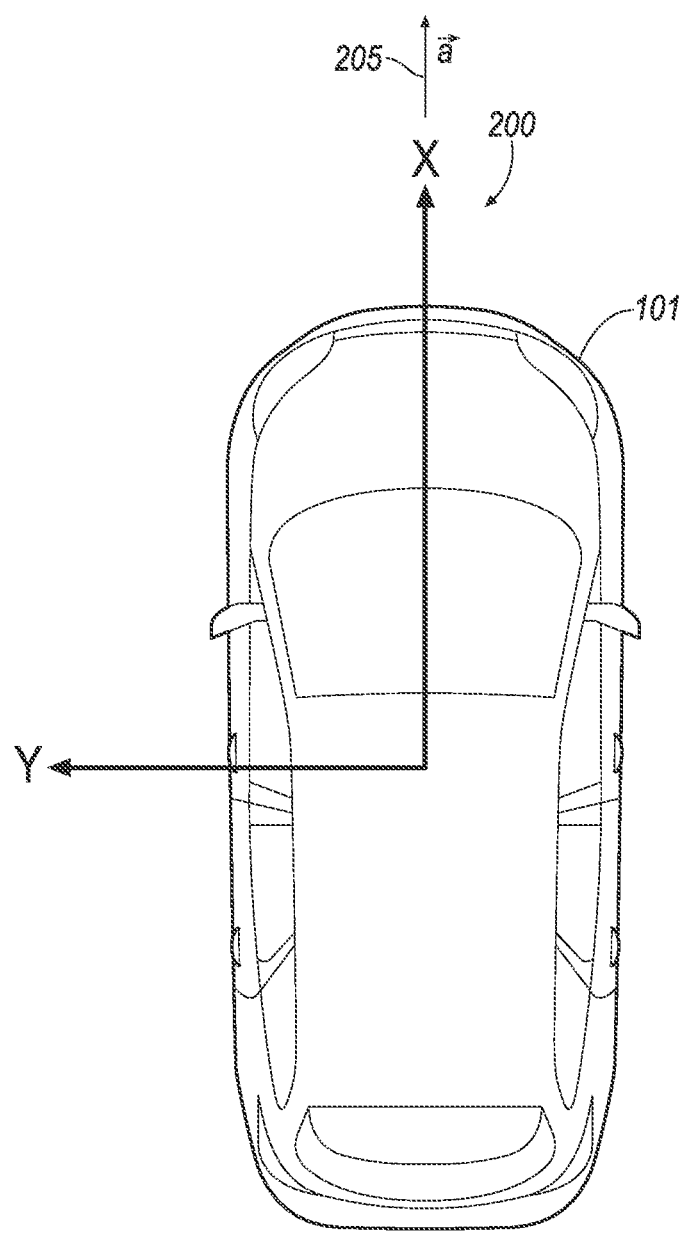
FIG. 2 is a plan view of an example vehicle with reference to a vehicle coordinate system.
Figure 3:
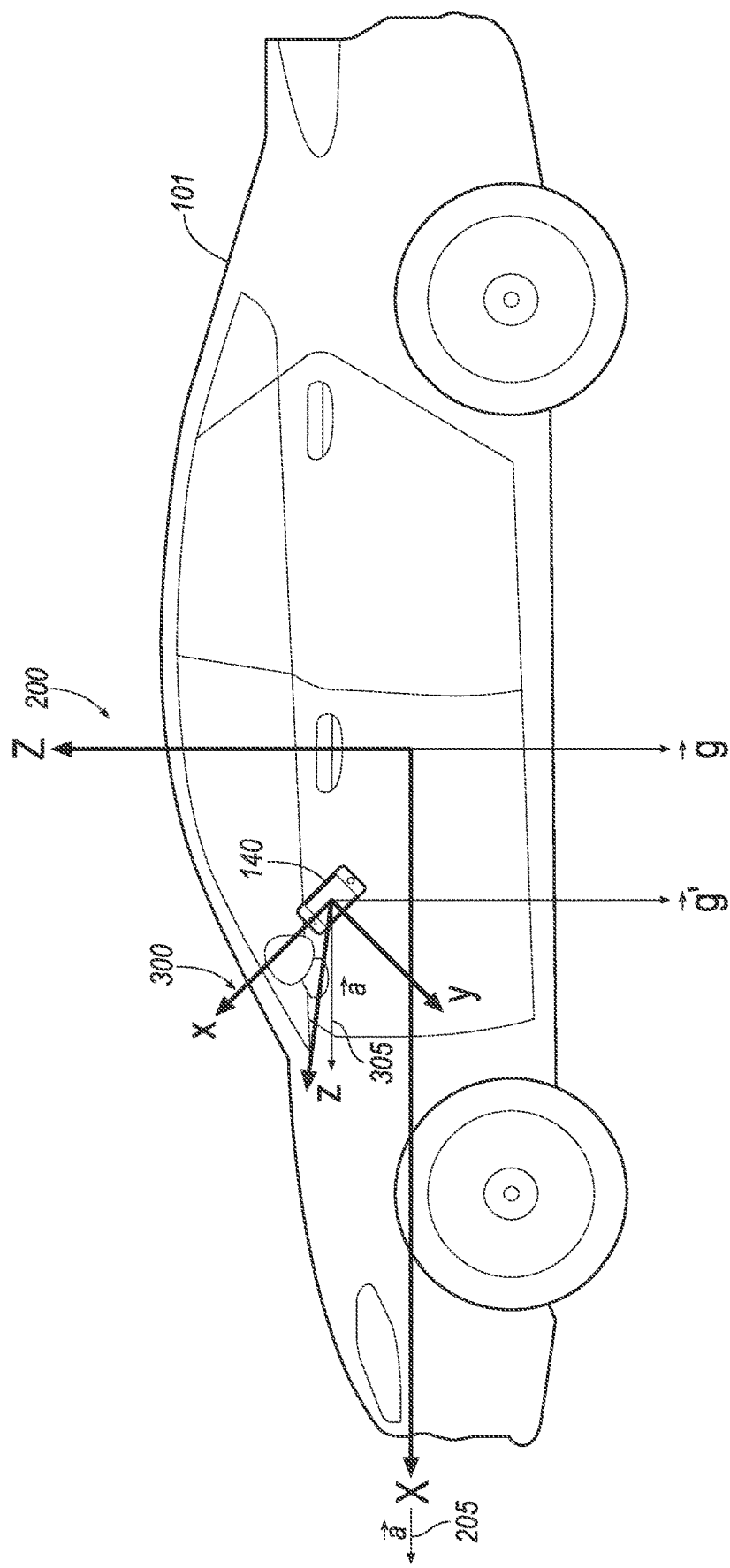
FIG. 3 is a side view of the example vehicle and a portable device in the example vehicle.

FIG. 2 is a plan view of an example vehicle 101 illustrating a vehicle coordinate system 200. The vehicle coordinate system 200 includes a longitudinal direction axis X and a lateral direction axis Y. Not shown in FIG. 2, but seen in FIG. 3, is a vertical direction axis Z, which is normal to the plane defined by the X and Y axes (which are normal to each other as well as to the Z axis). The longitudinal direction axis X extends in a vehicle-forward direction, and the lateral direction axis Y extends perpendicularly in a cross-wise vehicle direction. The computer 105 collects data 115 from the sensors 110 in the vehicle coordinate system 200 to orient objects detected by the sensors 110 relative to the vehicle 101.

The vehicle 101 defines a vehicle heading vector 205. The vehicle heading vector 205 is a 3-dimensional vector that defines the direction of movement of the vehicle 101 in the vehicle coordinate system 200. For example, the heading vector 205 aligns with the X axis when the vehicle 101 is moving straight forward, e.g., accelerating upon actuation of an accelerator pedal. The heading vector 205 can define an acceleration $\vec{a}$ having three components: $a_X$, i.e., acceleration in the X direction, $a_Y$, i.e., acceleration in the Y direction, and $a_Z$, i.e., acceleration in the Z direction. Alternatively, the computer 105 can determine the heading vector 205 based on, e.g., geo-coordinate data 115 from a server 130.

FIG. 3 is a side view of the example vehicle 101 with an example portable device 140 illustrating the vehicle coordinate system 200 and a portable device coordinate system 300. As described above, the vehicle coordinate system 200 defines a vertical direction axis Z. The portable device coordinate system 300 defines a longitudinal direction axis x, a lateral direction axis y, and a vertical direction axis z. Because the portable device 140 is movable relative to the vehicle 101, one or more axes x, y, z in the portable device coordinate system 300 may not align with corresponding axes X, Y, Z in the vehicle coordinate system 200. Thus, in order to use data from sensors 150 in the portable device 140, the computer 105 and/or the processor 145 must transform data from the portable device coordinate system 300 into the vehicle coordinate system 200.

The computer 105 can determine a calibration vector $\vec{T}$ between the portable device coordinate system 300 and the vehicle coordinate system 200. As used herein, a "calibration vector" is a 3×3 matrix that transforms coordinates in the portable device coordinate system into coordinates in the vehicle coordinate system 200. That is, the computer 105 can use the calibration vector $\vec{T}$ to transform data 115 from the portable device 140 in the portable device coordinate system 300 into the vehicle coordinate system 200, which the computer 105 can then use to actuate components 120. For example, where $\vec{r}$ is a set of data collected in the portable device 140, the calibration vector $\vec{T}$ can transform data $\vec{r}$ in the portable device coordinate system 300 into data $\vec{R}$ calibrated for use in the vehicle coordinate system 200:

$$\vec{R} = \vec{T}\vec{r} \quad (1)$$

$$\vec{r} = \vec{T}^{-1}\vec{R} = \begin{bmatrix} T_{11} & T_{12} & T_{13} \\ T_{21} & T_{22} & T_{23} \\ T_{31} & T_{32} & T_{33} \end{bmatrix} \vec{R} \quad (2)$$

where $\vec{T}^{-1}$ is the inverse matrix of $\vec{T}$ and the numerical subscripts $T_{mn}$ indicate the row and column of the specific element in the matrix $\vec{T}^{-1}$. For example, $T_{11}$ is the element in the first row and the first column of the matrix $\vec{T}^{-1}$. Upon determining the inverse matrix $\vec{T}^{-1}$, the computer 105 can use conventional linear algebra techniques to determine the calibration vector $\vec{T}$.

Moving the portable device 140 can define a portable heading vector 305. As used herein, an "portable heading vector" is a 3-dimensional vector representing a direction of movement of the portable device 140 in the portable device coordinate system 300. The processor 145 and/or the computer 105 can determine the portable heading vector 305 based on acceleration data 115 from the sensors 150. As described below, the acceleration $\vec{a}$ of the portable device 140 has three components: $a_x$, the acceleration in the x direction, $a_y$, the acceleration in the y direction, and $a_z$, the acceleration in the z direction. In the example of FIG. 3, the acceleration $\vec{a}$ of the vehicle 101 is the same as the acceleration $\vec{a}$ of the portable device 140 because the portable device 140 does not move relative to the vehicle 101, as described below. Alternatively, if the portable device 140 moves relative to the vehicle 101, an acceleration $\vec{a}_{vehicle}$ of the vehicle 101 may differ from an acceleration $\vec{a}_{device}$ of the portable device 140, and the computer 105 can determine not to determine the calibration vector $\vec{T}$. When the vehicle 101 accelerates along the X axis, e.g., from actuation of an accelerator pedal or a brake pedal, the computer 105 can actuate one or more sensors 110 to collect data 115 about the acceleration. The computer 105 can use the portable heading vector 305 to determine the calibration vector $\vec{T}$, as described below.

The computer 105 can determine a gravity vector $\vec{g}$ for the vehicle 101. The gravity vector $\vec{g}$ is an acceleration vector in the direction of gravity, i.e., substantially normal to a horizontal plane. In the vehicle coordinate system 200, the direction of gravity is the negative Z direction. The computer 105 can determine the gravity vector g based on acceleration data 115 of the vehicle 101. That is, based on acceleration of the vehicle 101 in the Z direction, the computer 105 can determine the gravity vector $\vec{g}$.

The computer 105 and/or the processor 145 can determine a gravity vector g' for the portable device 140. The gravity vector $\vec{g}'$ is an acceleration vector in the direction of gravity. Because the portable device coordinate system 300 may not be aligned with the vehicle coordinate system 200, the gravity vector $\vec{g}'$ may have nonzero components in all of the x, y, z directions. Thus, to align the portable device coordinate system 300 with the vehicle coordinate system 200, the computer 105 and/or the processor 145 can use the components of the gravity vector $\vec{g}'$ in the portable device coordinate system 300 to determine a linear transformation to align data 115 in the portable device coordinate system 300 with the Z direction of the vehicle coordinate system 200.

The computer 105 can identify a heading vector 205 based on a vehicle 101 acceleration. As described above, the computer 105 can actuate one or more sensors 110 to determine an acceleration $\vec{a}$ of the vehicle 101. When the vehicle 101 accelerates along the X axis, e.g., from actuating the accelerator pedal or the brake pedal, the acceleration $\vec{a}$ of the vehicle 101 can be defined as the following matrix:

$$\vec{a} = \begin{bmatrix} a_X \\ 0 \\ 0 \end{bmatrix} \quad (3)$$

The computer 105 can collect data 115 from the portable device 140 and from vehicle components 120 for a predetermined time period. The "time period" is a predetermined number of seconds in which data 115 are collected. The time period can be determined based on, e.g., empirical testing of data 115 collection and reliability of the collected data 115. The computer 105 can communicate with the components 120 and the portable device 140 over the network 125. The computer 105 can collect, e.g., acceleration data 115 during the time period. The computer 105 can determine the calibration vector $\vec{T}$ based on data 115 from a specific time period, e.g., a time period in which the vehicle 101 accelerates in the X direction and the portable device 140 is stable. Alternatively, if the computer 105 does not determine the calibration vector $\vec{T}$ based on a specific time period (e.g., the vehicle 101 did not accelerate during the time period), the computer 105 can determine the calibration vector $\vec{T}$ based on data 115 collected during a subsequent time period.

The computer 105 can determine a stability of the portable device 140. As used herein, a "stability" is a measure of whether the portable device 140 moves relative to the vehicle 101. For example, if the portable device 140 is mounted to the vehicle 101, i.e., directly attached to a portion of the vehicle 101 such that the portable device 140 does not move relative to the vehicle 101, the computer 105 can determine that the portable device 140 is "stable." The portable device 140 can be mounted to, e.g., an instrument panel, a central console, a dashboard, etc. The computer 105 can determine that the portable device 140 is mounted to a part of an interior of the vehicle based on, e.g., user input to the computer 105 indicating that the portable device 140 is mounted. The user input indicates that the user has determined that the portable device 140 is stable. In another example, if the portable device 140 is placed on a central console where the portable device 140 can slide, the computer 105 can determine that the portable device 140 may not be stable, and the computer 105 can determine the stability of the portable device 140 based on data from one or more sensors 150, as described below. When the portable device 140 is not stable, the acceleration of the portable device 140 can differ from the acceleration of the vehicle 101, and the computer 105 can determine not to identify the calibration vector $\vec{T}$. The stability of the portable device 140 can be based on, e.g., data 115 from a gyroscope 150 in the portable device 140, a setting input from the user indicating that the portable device 140 is mounted, etc.

The computer 105 can determine the stability of the portable device 140 based on an angular velocity of the portable device 140. As used herein, an "angular velocity" is a measurement of a speed of rotation about one or more of the axes x, y, z in the portable device coordinate system 300. The computer 105 can collect angular velocity data 115 from the gyroscope 150 and determine whether the angular velocity of the portable device 140 is below a threshold for the duration of the time period. The threshold can be determined based on, e.g., empirical testing of acceleration data 115 at differing angular velocities to indicate at what angular velocity the acceleration data 115 of the portable device 140 differs from the acceleration data of the vehicle 101 such that performing the calibration from the portable device coordinate system 300 to the vehicle coordinate system 200 results in transformations of data 115 to the vehicle coordinate system 200 that differ from a predetermined expected transformation by a test threshold, e.g., a resolution of the sensors 110, 150.

The computer 105 can determine whether a steering wheel angle is below a steering threshold for the duration of the time period. A "steering wheel angle" is an angle of a steering wheel away from a neutral position. The vehicle 101 can include an angle sensor 110 that measures the steering wheel angle. The steering threshold can be determined based on, e.g., empirical testing of acceleration data 115 at differing steering wheel angles to indicate at what steering wheel angle the vehicle 101 is no longer moving straight in a roadway lane. The empirical testing can include vehicles 101 having different steering ratios, i.e., a ratio between the steering wheel angle and an angle of movement of the vehicle 101.

The computer 105 can identify a pedal actuation, i.e., an actuation of an accelerator pedal or a brake pedal, during the time period. The accelerator pedal and the brake pedal can send data 115 to the computer 105 over the network 125 indicating actuation of the accelerator pedal or the brake pedal. For example, the accelerator pedal and the brake pedal can each include a respective pedal angle sensor, and data 115 indicating that the pedal angle of one of the accelerator pedal or the brake pedal exceeds an angle threshold, the computer 105 can determine that the respective pedal was actuated. The angle threshold can be determined based on, e.g., empirical testing of respective pedal angles to initiate acceleration or braking of the vehicle 101. If the user actuates the accelerator pedal and/or the brake pedal during the time period, the computer 105 can determine that the vehicle 101 had a nonzero longitudinal acceleration $a_X$ during the time period. As described above, the longitudinal acceleration $a_X$ can define a heading vector 205 for the vehicle 101 that the computer 105 can use to determine the calibration vector $\vec{T}$. If the computer 105 identifies the pedal actuation in the time period, the computer 105 can determine the calibration vector $\vec{T}$. If the computer 105 identifies no pedal actuation in the time period, the computer 105 determines that the vehicle 101 did not accelerate in the time period and identifies a pedal actuation in a subsequent time period.

Figure 4:
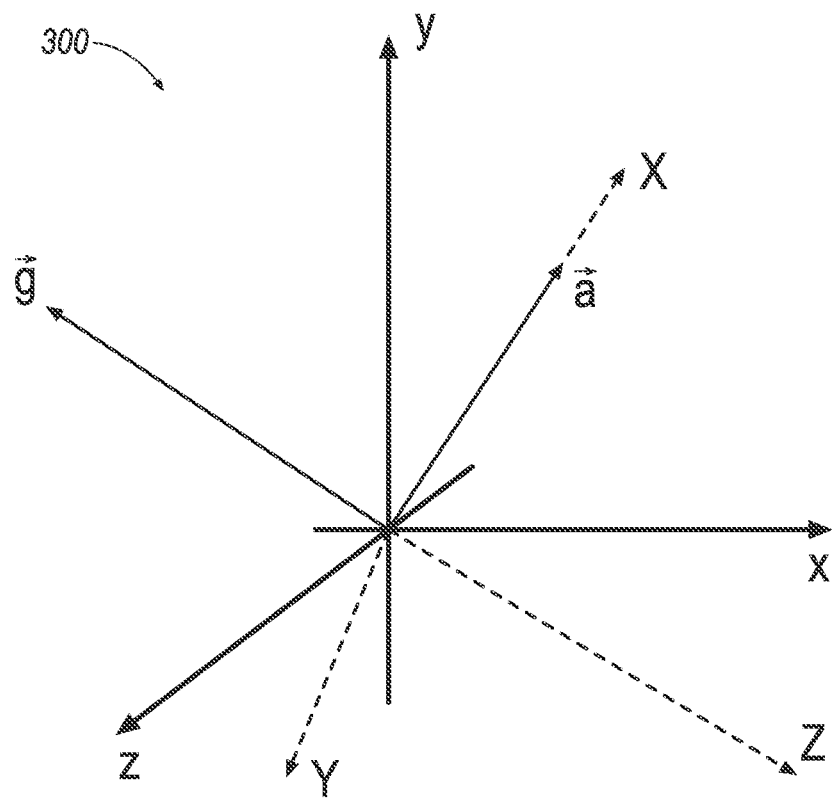
FIG. 4 is a diagram of a heading vector in a portable device coordinate system.

FIG. 4 is a diagram of the portable heading vector 305 in the portable device coordinate system 300. In the portable device coordinate system 300, the acceleration components $a_x$, $a_y$, $a_z$ of the acceleration $\vec{a}$ are defined along the x, y, z axes. The computer 105 can determine the calibration vector $\vec{T}$ by identifying transformations between data 115 in the portable device coordinate system 300 onto each of the X, Y, Z axes of the vehicle coordinate system 200. For example, as described below, the computer 105 can use the gravity vectors $\vec{g}$, $\vec{g}'$ to determine transformations to the Z axis, the heading vectors 205, 305 to determine transformations to the X axis, and conventional techniques to determine transformations to the Y axis based on the transformations to the X, Z axes.

To determine transformations from three-dimensional coordinates in the portable device coordinate system 300 to the Z axis in the vehicle coordinate system 200, the computer 105 can determine gravity vectors $\vec{g}$, $\vec{g}'$ for the vehicle 101 and the portable device 140, respectively. The computer 105 can apply a low-pass filter to the acceleration data 115 of the vehicle 101 and from the portable device 140. As used herein, a "low-pass filter" is programming to accept as input a raw signal and to output a filtered signal including only frequencies below a specified threshold. The threshold can be based on, e.g., empirical testing of vehicle 101 accelerations from gravity and from a propulsion 120. The threshold can be, e.g., 1 Hertz. The low-pass filter removes accelerations due to propulsion or brake actuation, and the filtered data 115 can indicate an acceleration due to gravity on the portable device 140.

The computer 105 can determine the gravity vector $\vec{g}$ of the vehicle 101 based on acceleration data 115 from the vehicle. Because gravity accelerates in the negative Z direction in the vehicle coordinate system 200, the gravity vector $\vec{g}$ is defined as:

$$\vec{g} = \begin{bmatrix} 0 \\ 0 \\ a_Z \end{bmatrix} \quad (4)$$

The computer 105 can determine the gravity vector $\vec{g}'$ based on the filtered acceleration data 115. Because the gravity vector $\vec{g}'$ for the portable device 140 has a same direction as the gravity vector $\vec{g}$ for the vehicle 101, the computer 105 can use the gravity vector $\vec{g}'$ to determine transformations from the portable device coordinate system 300 to the Z axis of the vehicle coordinate system 200. The computer 105 can determine the gravity vector $\vec{g}'$ based on the x, y, z components of the filtered acceleration data 115:

$$\vec{g}' = \begin{bmatrix} \bar{a}_x \\ \bar{a}_y \\ \bar{a}_z \end{bmatrix} \quad (5)$$

where $\bar{a}_x$, $\bar{a}_y$, $\bar{a}_z$ are the components of the filtered acceleration data 115 after applying the low-pass filter to acceleration components $a_x$, $a_y$, $a_z$ of the portable device 140. Thus, the transformation between the portable device coordinate system 300 and the Z axis of the vehicle coordinate system 200 can be determined:

$$\vec{g} = T^{-1} \begin{bmatrix} 0 \\ 0 \\ -\|\vec{g}\| \end{bmatrix} = T^{-1} \begin{bmatrix} -\bar{a}_x \\ -\bar{a}_y \\ -\bar{a}_z \end{bmatrix} = -\begin{bmatrix} T_{13} \\ T_{23} \\ T_{33} \end{bmatrix} \quad (6)$$

where the negative signs account for $\vec{g}$ extending along the negative Z axis and the double vertical lines shown in $\|\vec{g}\|$ are the magnitude function that returns the magnitude of the vector within the lines.

The computer 105 can determine transformations from three-dimensional data in the portable device coordinate system 300 to the X axis of the vehicle coordinate system 200 based on the heading vector 205 and the portable heading vector 305. When the portable device 140 is stable relative to the vehicle 101, the heading vector 205 and the portable heading vector 305 align.

The computer 105 can determine a longitudinal acceleration $\vec{a}_{long}$ of the portable device 140 based on the filtered acceleration data 115. Because the low-pass filter removed acceleration due to propulsion and brake actuation, the computer 105 can determine a longitudinal acceleration vector $\vec{a}_{long}$ by subtracting the filtered acceleration data 115 from the collected acceleration data 115:

$$\vec{a}_{long} = \begin{bmatrix} a_{long,x} \\ a_{long,y} \\ a_{long,z} \end{bmatrix} = \begin{bmatrix} a_x - \bar{a}_x \\ a_y - \bar{a}_y \\ a_z - \bar{a}_z \end{bmatrix} \quad (7)$$

where $a_{long,x}$ is the longitudinal acceleration along the x axis, $a_{long,y}$ is the longitudinal direction along the y axis, and $a_{long,z}$ is the longitudinal acceleration along the z axis.

The computer 105 can determine the transformation to the X axis based on the longitudinal acceleration $\vec{a}_{long}$:

$$\vec{a}_{long} = T^{-1} \begin{bmatrix} \|\vec{a}_{long}\| \\ 0 \\ 0 \end{bmatrix} = \begin{bmatrix} T_{11} \\ T_{21} \\ T_{31} \end{bmatrix} \quad (8)$$

Upon defining transformations to the X, Z axes, the computer 105 can utilize conventional techniques to determine transformations to the Y axis. That is, according to conventional linear algebra techniques, the computer 105 can determine transformations to the Y axis:

$$\vec{b} = \vec{a}_{long} \times \vec{g} = T^{-1} \begin{bmatrix} 0 \\ \|\vec{a}_{long} \times \vec{g}\| \\ 0 \end{bmatrix} = \begin{bmatrix} T_{12} \\ T_{22} \\ T_{32} \end{bmatrix} \quad (9)$$

where x is the cross product function and $\vec{b}$ is a vector representing the cross product of the longitudinal acceleration $\vec{a}_{long}$ and the gravity vector $\vec{g}$. For example, the computer 105 can use data 115 indicating the acceleration vector $\vec{a}$ for the vehicle 101 and the portable device 140 with the transformations to the X, Z axes to solve for the remaining transformations to the Y axis. Upon determining transformations to the Y axis, the computer 105 can compose the transformations to the X, Y, Z axes into a single matrix to determine the inverse matrix $\vec{T}^{-1}$ and, using conventional techniques, the calibration vector $\vec{T}$:

$$T^{-1} = \begin{bmatrix} \dfrac{a_{long,x}}{\|\vec{a}_{long}\|} & \dfrac{b_x}{\|\vec{b}\|} & -\dfrac{g_x}{\|\vec{g}\|} \\ \dfrac{a_{long,y}}{\|\vec{a}_{long}\|} & \dfrac{b_y}{\|\vec{b}\|} & -\dfrac{g_y}{\|\vec{g}\|} \\ \dfrac{a_{long,z}}{\|\vec{a}_{long}\|} & \dfrac{b_z}{\|\vec{b}\|} & -\dfrac{g_z}{\|\vec{g}\|} \end{bmatrix} \quad (10)$$

The computer 105 can initiate a calibration. As used here, a "calibration" is programming that the computer 105 implements to determine the calibration vector $\vec{T}$ between the portable device coordinate system 300 and the vehicle coordinate system 200. The calibration allows the computer 105 to transform data 115 from the portable device 140 into the vehicle coordinate system 200, which the computer 105 can use to actuate components 120.

The computer 105 can initiate the calibration based on a portable device 140 stability and a steering wheel angle. As described above, the computer 105 can determine the calibration vector $\vec{T}$ when the vehicle 101 accelerates or decelerates substantially along the X axis, i.e., when the vehicle 101 is not turning, and when the portable device 140 is stable, i.e., the portable device 140 does not move substantially relative to the vehicle 101. Upon determining that the portable device 140 is stable and the steering wheel angle is below a steering threshold, as described above, the computer 105 can initiate the calibration.

Upon determining the calibration vector $\vec{T}$, the computer 105 can collect data 115 from the portable device 140 and transform the data 115 into the vehicle coordinate system 200. For example, when the portable device 140 is a gesture-recognition device, the portable device 140 can collect image data 115 of a user of the vehicle 101 with one or more sensors 150. The processor 145 can send the data 115 to the computer 105 via the network 125. The computer 105 can transform the data 115 with the calibration vector $\vec{T}$ and actuate one or more components 120 based on the transformed data 115. For example, the image data 115 from the portable device 140 can indicate a user gesture, e.g., a rotation of a user hand indicating a request to increase volume of an entertainment component 120, and the computer 105 can actuate the entertainment component 120 to increase the volume.

In another example, when the portable device 140 is a dashboard camera, the portable device 140 can collect image data 115 of objects around the vehicle 101 with one or more sensors 150. The processor 145 can identify an object using conventional image recognition techniques based on the image data 115. The processor 145 can send data 115 identifying the object and the position of the object in the portable device coordinate system 300 to the computer 105 via the network 125. Upon receiving the data 115 in the portable device coordinate system 300, the computer 105 can transform the data 115 with the calibration vector $\vec{T}$ to determine the position of the object in the vehicle coordinate system 200. The computer 105 can actuate one or more components 120 based on the position of the object, e.g., a steering component 120 to steer away from the object. The computer 105 can use the image data 115 from the portable device 140 to improve operation of, e.g., an advanced driver assistance system (ADAS), a user monitoring system, etc., and/or other components 120 that require accurate alignment of orientation.

In yet another example, the portable device 140 can verify data 115 collected by sensors 110 in the vehicle 101. For example, the computer 105 can determine a vehicle yaw rate, i.e., a rate of change of a vehicle heading angle, and the portable device 140 can determine a portable device yaw rate, i.e., a rate of change of a portable device heading angle. When the portable device 140 is stable relative to the vehicle 101, the vehicle yaw rate and the portable device yaw rate are substantially the same. The computer 105 can compare the vehicle yaw rate to the portable device yaw rate. If the vehicle yaw rate differs from the portable device yaw rate by more than a yaw rate threshold, the computer 105 can declare a fault and present an alert to a user indicating that one or more sensors 110 may require inspection. For example, the computer 105 can actuate a human-machine interface (HMI) such as a touchscreen display to display a visual alert. The yaw rate threshold can be determined as a maximum difference in the portable device yaw rate and the vehicle yaw rate when the portable device 140 is stable relative to the vehicle 101. Alternatively, the yaw rate threshold can be determined as a resolution of one or more of the sensors 110 of the vehicle and/or one or more of the sensors 150 of the portable device 140.

Figure 5:
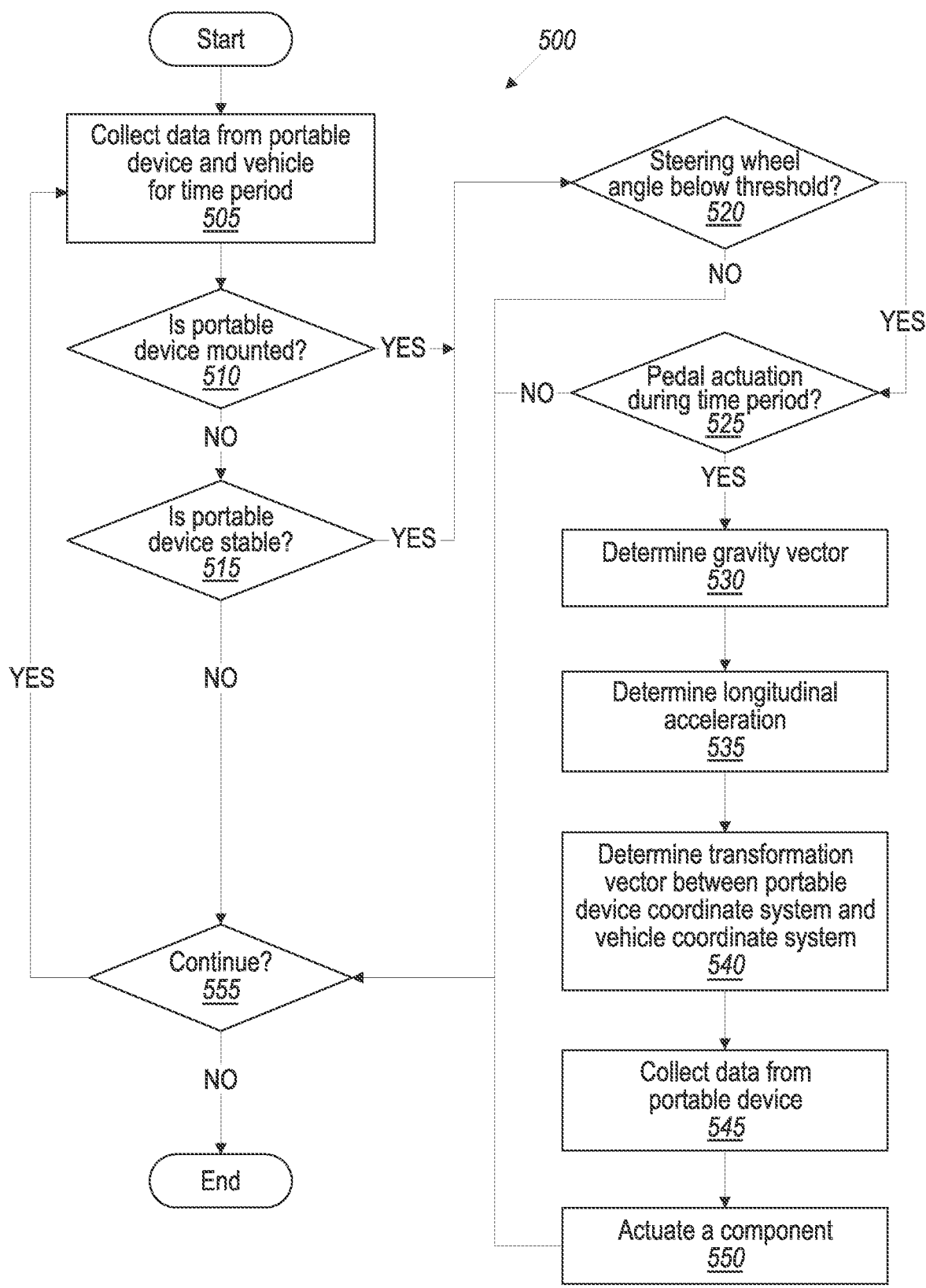
FIG. 5 is an example process for performing the calibration.

FIG. 5 is a diagram of an example process 500 for performing a calibration of a coordinate system 300 for a portable device 140 with a vehicle coordinate system 200. The process 500 begins in a block 505, in which the computer 105 collects data 115 from sensors 110 in the vehicle 101 and sensors 150 in the portable device 140 during a specified time period.

Next, in a block 510, the computer 105 determines whether the portable device 140 is mounted, i.e., directly attached to a portion of the vehicle 101 such that the portable device 140 does not move relative to the vehicle 101. The user can provide user input to the computer 105 indicating that the portable device 140 is mounted to, e.g., a steering wheel, a central console, an instrument panel, etc. If the portable device 140 is mounted, the process 500 continues in a block 520. Otherwise, the process 500 continues in a block 515.

In the block 515, the computer 105 determines whether the portable device 140 is stable based on data 115 from sensors 150. As described above, the computer 105 can determine an angular velocity of the portable device 140 based on data 115 from a gyroscope 150 of the portable device 140. If the angular velocity is below a threshold, the computer 105 can determine that the portable device 140 is stable. The threshold can be determined based on, e.g., empirical testing of acceleration data 115 at differing angular velocities to indicate at what angular velocity the acceleration data 115 becomes unreliable. If the computer 105 determines that the portable device 140 is stable, the process 500 continues in the block 520. Otherwise, the process 500 continues in a block 555.

In the block 520, the computer 105 determines whether data 115 indicating a steering wheel angle during the time period is below a steering threshold. The steering threshold can be determined based on, e.g., empirical testing of acceleration data 115 at differing steering wheel angles to indicate at what steering wheel angle the vehicle 101 is no longer moving straight in a roadway lane. The empirical testing can include vehicles 101 having different steering ratios, i.e., a ratio between the steering wheel angle and an angle of movement of the vehicle 101, i.e., empirical testing could apply for a vehicle 101 with a specified steering ratio. When the steering angle is below the steering threshold, the vehicle 101 moves substantially straight forward and the acceleration of the vehicle 101 is primarily in the longitudinal X direction of the vehicle coordinate system 200. If the steering wheel angle is below the steering threshold, the process 500 continues in a block 525. Otherwise, the process 500 continues in the block 555.

In the block 525, the computer 105 determines whether a pedal actuation occurred during the time period. As described above, actuation of a brake pedal or an accelerator pedal can generate acceleration in the longitudinal X direction of the vehicle coordinate system 200. If the computer 105 determines that a pedal actuation occurred during the time period, the process 500 continues in a block 530. Otherwise, the process 500 continues in the block 555.

In the block 530, the computer 105 determines a gravity vector $\vec{g}'$ for the portable device 140. As described above, applying a low-pass filter to the acceleration data 115 from the sensors 150 of the portable device 140 removes accelerations due to effects other than gravity, e.g., acceleration of the vehicle 101. The computer 105 can use the gravity vector $\vec{g}'$ to determine a transformation to the vertical axis Z in the vehicle coordinate system 200.

Next, in a block 535, the computer 105 determines a longitudinal acceleration $\vec{a}_{long}$. As described above, the longitudinal acceleration $\vec{a}_{long}$ is the acceleration filtered out from the low-pass filter. Thus, the longitudinal acceleration $\vec{a}_{long}$ is a difference between the acceleration data 115 and the gravity vector $\vec{g}'$.

Next, in a block 540, the computer 105 determines the calibration vector $\vec{T}$ between the portable device coordinate system 300 and the vehicle coordinate system 200. As described above, based on the longitudinal acceleration $\vec{a}_{long}$, the computer 105 can determine transformations from the portable device coordinate system 300 to the X axis of the vehicle coordinate system 200. Based on the gravity vector $\vec{g}'$, the computer 105 can determine transformations from the portable device coordinate system 300 to the Z axis of the vehicle coordinate system 200. Based on the determined transformations to the X, Z axes, the computer 105 can, based on conventional techniques, determine transformations from the portable device coordinate system 300 to the Y axis of the vehicle coordinate system 200. The computer 105 determines the calibration vector $\vec{T}$ as the composition of these three transformations.

Next, in a block 545, the computer 105 collects data 115 from the portable device 140. As described above, the processor 145 can actuate sensors 150 to collect data 115 and send the data 115 to the computer 105 via the network 125. The data 115 from the sensors 150 can include, e.g., images, position, speed, acceleration, etc. For example, the data 115 can be image data 115 of an interior of a vehicle 101 collected by an image sensor 150 of the portable device 140. In another example, the data 115 can be a position of an object identified by the portable device 140, the position listed in coordinates in the portable device coordinate system 300, and the computer 105 can transform the data 115 from the portable device 140 with the calibration vector $\vec{T}$ to identify the position of the object in the vehicle coordinate system 200.

Next, in a block 550, the computer 105 actuates one or more components 120 based on data 115 calibrated with the calibration vector $\vec{T}$. For example, based on image data 115 of a user gesture, calibrated into the vehicle coordinate system 200 so that the computer 105 can recognize the gesture (e.g., as a rotation of a user hand), the computer 105 can actuate an entertainment component 120 based on the recognized gesture to increase volume of the entertainment component 120. In another example, upon identifying the position of the object identified by the portable device 140 in the vehicle coordinate system 200, the computer 105 can actuate a steering component 120 to steer away from the object. In another example, the computer 105 can actuate a touchscreen display to display a visual alert upon identifying a fault based on a yaw rate of the portable device 140, as described above.

In the block 555, the computer 105 determines whether to continue the process 500. For example, if the computer 105 determines that the vehicle 101 has stopped and powered off, the computer 105 can determine not to continue the process 500. If the computer 105 determines to continue, the process 500 returns to a block 505 in which the computer 105 collects data 115 for a new time period. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify a steering wheel angle that is an angle of a steering wheel away from a neutral position;
   initiate a calibration based on a portable device stability and a steering threshold of the steering wheel angle;
   detect a vehicle pedal actuation; and
   then, based on a portable device acceleration, determine a calibration vector between a portable device coordinate system and a vehicle coordinate system.

2. The system of claim 1, wherein the instructions further include instructions to determine that the portable device is stable when an angular velocity of the portable device is below a threshold.

3. The system of claim 1, wherein the instructions further include instructions to determine the calibration vector based on a gravity vector and a heading vector of the portable device.

4. The system of claim 1, wherein the instructions further include instructions to determine a gravity vector based on an acceleration of the portable device.

5. The system of claim 4, wherein the instructions further include instructions to apply a low-pass filter to acceleration data from the portable device to determine the gravity vector.

6. The system of claim 1, wherein the instructions further include instructions to determine the calibration vector based on a heading vector of the vehicle.

7. The system of claim 1, wherein the vehicle pedal actuation is one of an accelerator pedal actuation or a brake pedal actuation.

8. The system of claim 1, wherein the instructions further include instructions to determine the calibration vector based on a vehicle longitudinal acceleration.

9. The system of claim 1, wherein the instructions further include instructions to determine the portable device stability based on data from a portable device gyroscope.

10. The system of claim 9, wherein the instructions further include instructions to determine an angular velocity of the portable device based on the data from the portable device gyroscope.

11. The system of claim 1, wherein the instructions further include instructions to determine the calibration vector upon detecting the pedal actuation in a specified time period.

12. The system of claim 1, wherein the instructions further include instructions to initiate the calibration when the portable device is stable and the steering wheel angle is below the steering threshold.

13. A method, comprising:
   identifying a steering wheel angle that is an angle of a steering wheel away from a neutral position;
   initiating a calibration based on a portable device stability and a steering threshold of the steering wheel angle;
   detecting a vehicle pedal actuation; and
   then, based on a portable device acceleration, determining a calibration vector between a portable device coordinate system and a vehicle coordinate system.

14. The method of claim 13, further comprising determining that the portable device is stable when an angular velocity of the portable device is below a threshold.

15. The method of claim 13, further comprising determining the calibration vector based on a gravity vector and a heading vector of the portable device.

16. The method of claim 13, further comprising initiating the calibration when the portable device is stable and the steering wheel angle is below the steering threshold.

17. A system, comprising:
   a portable device;
   means for identifying a steering wheel angle that is an angle of a steering wheel away from a neutral position;
   means for initiating a calibration based on portable device stability and a steering threshold of the steering wheel angle;
   means for detecting a vehicle pedal actuation; and
   means for determining a calibration vector between a portable device coordinate system and a vehicle coordinate system based on a portable device acceleration.

18. The system of claim 17, further comprising means for determining that the portable device is stable when an angular velocity of the portable device is below a threshold.

19. The system of claim 17, further comprising means for determining the calibration vector based on a gravity vector and a heading vector of the portable device.

20. The system of claim 17, further comprising means for initiating the calibration when the portable device is stable and the steering wheel angle is below the steering threshold.

* * * * *